United States Patent [19]

Shakib et al.

[11] Patent Number: 5,752,025

[45] Date of Patent: May 12, 1998

[54] METHOD, COMPUTER PROGRAM PRODUCT, AND SYSTEM FOR CREATING AND DISPLAYING A CATEGORIZATION TABLE

[75] Inventors: Darren Arthur Shakib, Redmond; William H. Rockenbeck, Woodinville; Max Loell Benson, Redmond; Milind Madhukar Joshi, Bellevue, all of Wash.

[73] Assignee: Microsoft Corporation, Redmond, Wash.

[21] Appl. No.: 679,052

[22] Filed: Jul. 12, 1996

[51] Int. Cl.⁶ .................................................. G06F 17/30
[52] U.S. Cl. ............................................. 395/613; 395/615
[58] Field of Search ........................................ 395/613, 615

[56] References Cited

U.S. PATENT DOCUMENTS

| | | | |
|---|---|---|---|
| 4,468,732 | 8/1984 | Raver | 395/613 |
| 4,862,408 | 8/1989 | Zamora | 395/613 |
| 4,939,689 | 7/1990 | Davis et al. | 395/613 |
| 5,117,349 | 5/1992 | Tirfling et al. | 395/603 |
| 5,303,367 | 4/1994 | Leenstra, Sr. et al. | 395/613 |
| 5,392,428 | 2/1995 | Robins | 395/603 |
| 5,428,778 | 6/1995 | Brookes | 395/615 |
| 5,455,945 | 10/1995 | VanderDrift | 395/602 |
| 5,546,526 | 8/1996 | Li et al. | 395/348 |
| 5,615,367 | 3/1997 | Bennett et al. | 395/613 |
| 5,627,979 | 5/1997 | Chang et al. | 395/335 |
| 5,630,125 | 5/1997 | Zellweger | 395/601 |

*Primary Examiner*—Wayne Amsbury
*Attorney, Agent, or Firm*—Workman Nydegger Seeley

[57] ABSTRACT

A method, computer program product, and system for creating and displaying a categorization table is provided. A categorization table into a set of data records is created and displayed by first sorting the data records according to data record fields, typically using an index. Next, a header table is created having a number of category columns that will hold values corresponding to a number of index columns. The combinations of values across each header row will be unique and the row will also have a count value indicating the number of data records having the unique combination of category values that can be used to quickly access the first data record in the sorted index. In this manner, all of the data records can be successively accessed knowing the count value and the location of the first data record. Additionally, header rows having no data records associated therewith are used to form the headings and subheadings of the categorization table. Finally, a processor will traverse the header table and cause the categorization table to be displayed on a display means. As part of the traversal, information contained in the header table is used to calculate a fractional position of a user's location with respect to the user's particular view of the categorization table. A plurality of user columns in the categorization table allow separate and distinct views by different users into the same set of data records and using the same header table.

26 Claims, 9 Drawing Sheets

| <User 1> | | <User 2> | | <Company> | <Division> | <Department> | CNT | |
|---|---|---|---|---|---|---|---|---|
| V | E | V | E | | | | | |
| 1 | 0 | 1 | 1 | ABC | - | - | 0 | |
| 0 | 0 | 1 | 1 | ABC | CORPORATE | - | 0 | |
| 0 | 0 | 1 | 1 | ABC | CORPORATE | HUMAN RESOURCES | N | |
| 0 | 0 | 1 | 1 | ABC | CORPORATE | ACCOUNTING | N | |
| 0 | 0 | 1 | 1 | ABC | CORPORATE | LEGAL | N | |
| 0 | 0 | 1 | 1 | ABC | R & D | - | 0 | |
| 0 | 0 | 1 | 1 | ABC | R & D | IS DEPARTMENT | N | |
| 0 | 0 | 1 | 1 | ABC | R & D | FACILITIES ENG. | N | |
| 0 | 0 | 1 | 1 | ABC | MANUFACTURING | - | 0 | |
| 0 | 0 | 1 | 1 | ABC | MANUFACTURING | PRODUCTION | N | |
| 0 | 0 | 1 | 1 | ABC | MANUFACTURING | SHIPPING | N | |
| ⋮ | ⋮ | ⋮ | ⋮ | ⋮ | ⋮ | ⋮ | ⋮ | |
| 1 | 1 | 1 | 1 | LMN | - | - | N | }158 |
| 1 | 1 | 1 | 1 | LMN | CORPORATE | - | N | }160 |
| 1 | 0 | 1 | 1 | LMN | CORPORATE | HUMAN RESOURCES | N | }162 |
| 1 | 0 | 1 | 1 | LMN | MANUFACTURING | INVENTORY | N | }164 |
| ⋮ | ⋮ | ⋮ | ⋮ | ⋮ | ⋮ | ⋮ | ⋮ | |
| 1 | 1 | 1 | 1 | XYZ | - | - | 0 | }188 |
| 1 | 0 | 1 | 1 | XYZ | - | LEGAL | N | }190 |
| 1 | 0 | 1 | 1 | XYZ | - | FINANCE | N | }192 |
| 1 | 1 | 1 | 1 | XYZ | - | PLANNING | N | }194 |

FIG. 5

METHOD, COMPUTER PROGRAM PRODUCT, AND SYSTEM FOR CREATING AND DISPLAYING A CATEGORIZATION TABLE

BACKGROUND OF THE INVENTION

1. The Field of the Invention

This invention relates to methods and systems for assisting users of computer equipment to navigate through vast amounts of data. More particularly, this invention relates to ways of creating and displaying a multi-level categorization table having expandable headings thereby allowing a user to focus in on desired information in a visually coherent manner.

2. Present State of the Art

When navigating through the ever increasing amounts of data that is readily available and necessary in operating today's complex computer systems, computer users typically manage and find particular files, programs, and other data objects by mechanisms using the computer display. Such mechanisms will visually display the objects in some form of organized, often hierarchial, fashion. Furthermore, a user is often able to manipulate the display mechanism in order to select objects for appropriate actions (starting a program, printing a file, etc.).

More advanced organizational systems will allow the user to change the way the objects or other information is viewed in order to focus in on relevant information amidst the vast quantities of potentially viewable information. From the rudimentary "dir" command in the DOS operating environment, which allows a user to search for files in a file system, to complex and robust GUI file navigation systems, which allow custom tailoring of directory hierarchy to suit the purposes of the user, many different visual systems have been devised for navigating a computer file system. Likewise, a number of systems exist for navigating any collection of data records forming a database.

One common system found in a variety of hardware/software computer systems and applied in a variety of different contexts is the categorization table. A categorization table organizes data under successive and expandable levels of categorized headings. Such headings give relevant information to the user as to the nature of the underlying subheadings and/or data grouped under particular headings at a given level.

Initially, the category level one headings will be visible on the display means in the "collapsed" state—a state where no subheadings or data entries are listed. If a particular top-level (level one) heading is "expanded" a number of category subheadings (level two) are displayed, often indented or otherwise distinguished, underneath the expanded top-level heading. Further, depending on the number of successive levels, there may be successive groups of indented subheadings until the actual desired information is listed under the deepest subheading and data may appear under any pertinent heading or subheading. Whether a heading or subheading is "expanded" or "collapsed" is typically indicated by a plus symbol "+" (collapsed) or a minus symbol "−" (expanded) located in a small box adjacent to the heading or subheading.

By interacting with the categorization table, a user may create a customized "view" into the quantity of data with the most relevant data being displayed under expanded headings and subheadings while non-relevant data remains unseen under the upper or top level headings. Furthermore, a categorization table may be displayed within a display window located within the computer display wherein the entire categorization table is unable to be displayed within the confines of the window boundaries. In such a circumstance, a fractional position indication is displayed to give the user guidance as to where the portion shown in the window is located in relation to the entire table. This fractional position indication can be based on fractional position within the view created by an individual user expanding and collapsing the various category level headings or it may be based upon the relative location within the total amount of data or information.

While fractional position may be indicated in a variety of different ways, one common implementation uses a scroll bar within a scrolling column, the column running along the entire side of the display window. The bar shows the relative location of what is displayed by its position within the column. In addition, an indication of the amount of information displayed with respect to the entire categorization table is shown by the relationship in length of the bar with respect to the length of the column. Again, these relationships for location and amount of categorization tables displayed may be based on the user created and dynamic view into the data or the relatively more static totality of information as explained above.

When a view into data changes because of a user expanding or collapsing category headings, then the fractional indication must be altered to reflect this change. While this presents little problem in some situations, server applications processing thousands of data records and accessed by multiple clients need the most efficient mechanisms for calculating fractional position information. If a categorization table implementation requires complete traversal of the entire database of information in order to update changes to the displayed categorization table in response to use interaction or database changes (additions, deletions, or modifications of data records) substantial performance degradation may result. This is particularly true when the database becomes very large.

A program that navigates a personal computer's file system readily shows how a categorization table may operate. The top level category would be the various hard drives that are accessible from that computer (both resident and networked), each drive being listed as a category level one heading. Should a user choose to expand a particular hard drive, the next level would indicate the directories found on that particular hard drive. In such an instance, both subheadings and ultimate data objects could be listed. Further, a user may delve deeper into the file system hierarchy by expanding the various headings representing the directories and subdirectories until a desired file is located.

Another useful example would be a large collection of data records organized and accessed through a categorization table. Each category level can represent a particular quality regarding the data with the values of each particular category level listed as expandable headings. For example, in a data base of computer hardware and software problem reports, a top level category could be the particular area of the problem, such as a hard drive, CPU, word processing software, network software, etc. A level two category might then divide the problem reports according to priority levels. Finally, a third category level may divide the problem reports according to particular companies logging the problems. When a user searches through the data base using the categorization table and expands to the third level in the above described example, a portion of each data record (e.g., a subject line) may be listed to identify each individual report. A user could then select the individual report and open it for more detailed information or otherwise process it.

When large amounts of data are managed by a categorization table, careful attention must be given to the underlying methods of creating and displaying the table so that it may perform efficiently and effectively. Because updating the visually displayed table occurs frequently in response to a user changing the view into the data by expanding and collapsing headings or repositioning the display window to show a different portion of the categorization table, small excesses in processing can have tremendous impacts on performance. Other events that effect processing are changes (additions, deletions, and modifications) made to the database of information that may need to be reflected in the visually displayed categorization table. Further, it is desirable that multiple users be able to create independent views into the database of information in a distributed database environment where the information will be accessed by many different users having separate displays.

SUMMARY AND OBJECTS OF THE INVENTION

It is an object of this invention to create and display categorization tables into data records more efficiently and to do so using less system resources, allowing for easy update of the categorization table, and providing independent user views into the data records. Another object of this invention is to provide a way of calculating a more accurate fractional percentage indication and to do so more rapidly. Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and system for creating and displaying a categorization table is provided. By creating a categorization table into a quantity of data records with data organized under headings which can be expanded or collapsed, users can quickly tailor the display to focus on important information. This invention describes an efficient process of building and displaying a categorization table into a quantity of data records by use of one or more category columns within a header table that is a fraction the size of the actual database. The category columns are combined to sort and group the data, the category columns themselves representing potential category headings for the categorization table. The header table provides a mechanism that can be quickly traversed to create a categorization table that only accesses the actual data records when necessary for displaying data record information under the relevant subheadings that are expanded in the displayed categorization table.

In environments where the amount of data in a table is small, the process of generating a categorization table can be implemented in almost any fashion with little difference in performance. If, however, the table grows in size to categorize data records numbering in the thousands or tens of thousands, creating and displaying a categorization table requires careful attention to efficiency in terms of both execution speed and storage capacity.

In order to speed the generation of the categorization table, the present invention sorts the data records (or an index into the data records) by the desired combination of index columns. The index columns are sorted data field columns (if the data records themselves are sorted) or sorted by sort key columns (if an index into the data records is sorted). The invention then creates at least one "header table" which reflects and indexes the sorting performed on the database. The header table consists of header rows, which are used during header table traversals to display the various levels of categories and that correspond to each unique combination of category column values as well as providing additional indexing structure.

The header table category columns are chosen from the index columns resulting from the sorting performed on the database. A significant storage space savings is achieved by creating only one header row for each unique combination of category column values that represents many actual data records. A count value is stored in the header row to signify how many data records have that particular category column value combination. The first data record corresponding to the unique category column value combination can be quickly located in the index since the same values are used in both. Because the data records are sorted either directly or through indices, all data records having the unique combination of category column values will be located successively in order allowing all of them to be accessed once access is acquired to the initial data record (or sort index entry) and count of how many data records exist having the particular unique combination of category column values.

During traversal of the header table, the header row is used to quickly arrive at the first sorted data record and the count is used to access however many successive data records is indicated for display. This allows quick and efficient access to the desired data records when necessary.

User view columns are also part of the header table and can be advantageously used during traversal of the header table as part of the display process. Each user view column has attributes set to indicate whether a particular row is visually displayed (V) or if a particular heading is expanded (E). During traversal, only rows that are visually displayed need be processed and the expansion information is used to provide the appropriate visual device (usually "+" or "−") near the appropriate heading and assist in fractional position calculations.

Multiple user columns allow independent and unique user views into the data records. This also allows efficient and accurate fractional position calculations to be made in a client/server distributed environment. The fractional position calculations can be easily made utilizing only the header table for the calculations. Furthermore, the header table is an aid to determining what portion of the user created view is actually displayed in the viewing window.

One advantage of using indices for sorting the data records is that the same body of data may be categorized quite differently depending on which data fields are chosen as sort keys for the indices. In this manner, many different categorization tables may be made into the same data records with a minimal amount of additional overhead by first creating corresponding index tables.

Once a header table and index is created, it will be updated as necessary to reflect insertions, deletions, and changes made to the individual data records.

These and other objects and features of the present invention will become more fully apparent from the following description and appended claims or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 5 is a detailed drawing of a header table for a name contact database that is categorized based on company, division, and department and shows how data and further headings can be shown under the same heading.

DETAILED DESCRIPTION OF THE PREFERRED EMBODIMENTS

As used herein, the term "data record" indicates an identifiable and retrievable portion of data usually having at least one defined data record field. This definition includes, but is not limited to, database records, e-mail messages, files in a file system, objects in a directory, etc. Data records that are referenced as part of an index or table need not be in the same uniform database or be of equal type or size but must have common fields for sorting.

As used herein, a "sorted field index" is created when either the data records themselves are sorted according to fields in the data records or a separate index is used that uses data record fields as sort keys. Whether sorted by data record fields or sort keys, the columns formed are known as index columns.

As used herein, the term "reference" or "referencing" when used in connection with data records incorporates both direct (i.e., the reference value leads directly to the data record) and indirect (i.e., the reference value leads into one or more indices that eventually leads, indirectly, to the data record) and by searching through an index.

As used herein, a "table" refers to information arranged in columns and rows. A table "column" refers to values of information contained in every row of the table while a table "row" are individual values taken across all columns of the table.

A "storage means," or "storage system" are defined broadly to incorporate any type of device interfacable with a CPU that is used to memorize information and includes both long-term and short-term storage. Thus, storage means would include, though not be limited to, cache memory, RAM, disk storage, tape storage, etc. Furthermore, storage means contemplates the entire system of storage incorporated by a computer in combination so that the RAM, cache, and disk drive together could be considered a storage means or storage system. A storage means can also be logically partitioned into different locations so that items are stored in different media or on different parts of the same media. For example, a storage means comprising RAM and disk storage could be logically partitioned so that item A is stored in a portion of RAM (first partition or location), item B is stored in another portion of RAM (second partition or location), and item C is stored on disk (third partition or location).

Figure 1:
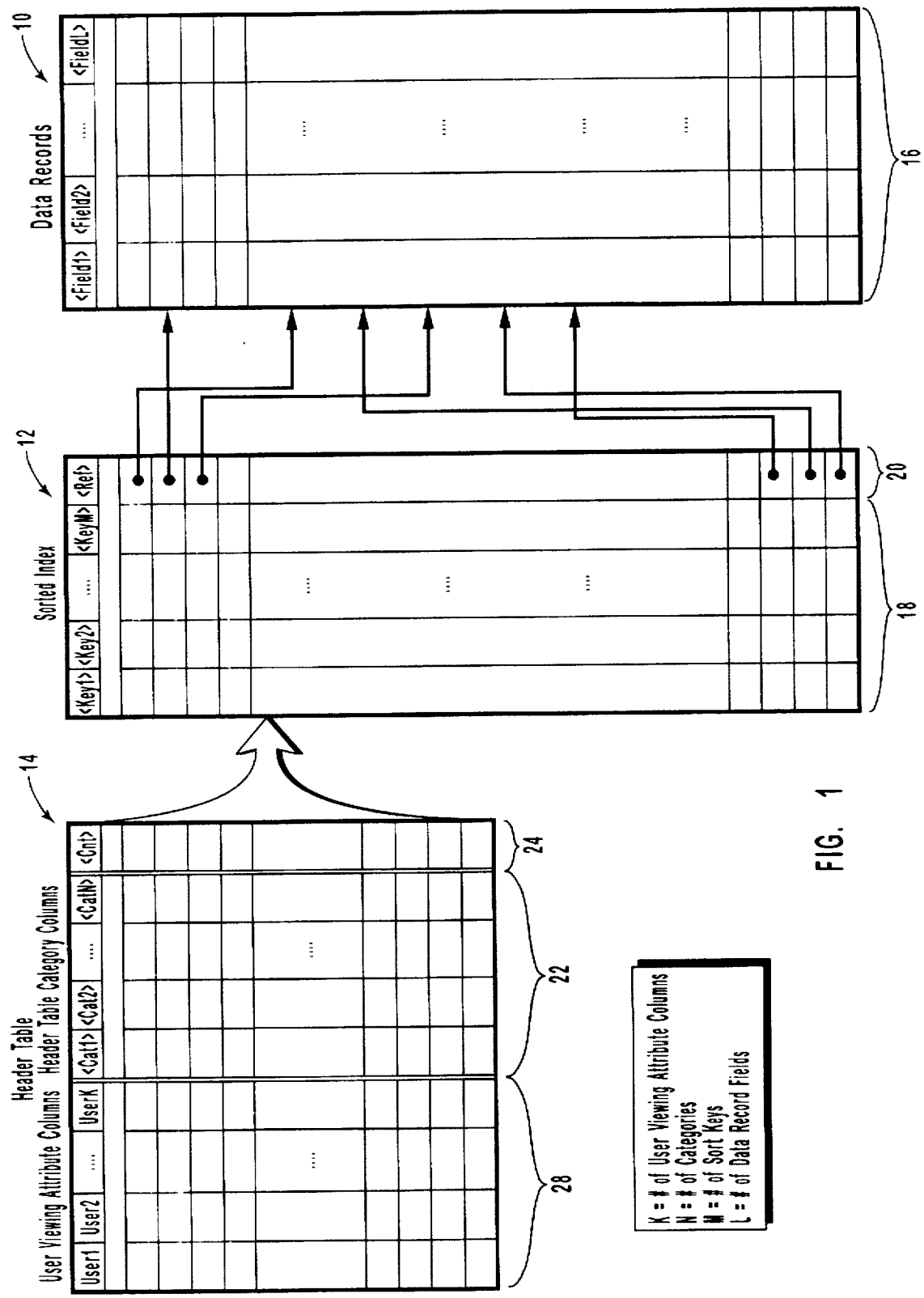
FIG. 1 is a conceptual overview block diagram depicting an unsorted database of data records, a sorted index table into the data records, and a header table having category columns and user view attribute columns.

Referring now to FIG. 1, the environment of the present invention along with the present invention is shown. A plurality of data records 10 are accessed through a sorted index 12. A header table 14 references the plurality of data records 10 through the sorted index 12. Header table 14 will be traversed in order to create and display a categorization table on an appropriate display means such as a computer monitor. Other display means include, but are not limited to, television monitors, laptop computer LCD displays, handheld computer LCD displays, and other forms of display providing visually perceptible images.

The plurality of data records 10 has a plurality of field columns 16. Each individual data record is defined into fields, each field representing a certain attribute of the data. It may be noted that the collection or plurality of data records referred to in their entirety may be called a database. Furthermore, each individual data record need not be exactly like the others in terms of size or number of fields.

According to the present invention, the data records must be sorted based on data record field values by at least one index column. This is important for the header rows as will be explained hereafter. This sorting may occur directly, wherein the data records themselves are sorted according to the field values, or it is common to perform the sort through use of an index as illustrated. When the data records themselves are sorted, the sorted field columns 16 become index columns that are referenced by the header table 14.

When the sort is performed through the use of a sort index table, the sorted index 12 has a plurality of sort key columns 18 and a reference column 20. Each entry into the sorted index 12 has a reference into the corresponding entry of the data records 10. When the number of data records 10 is large, it may be undesirable to sort the data records themselves and a sorted index 12 provides a convenient mechanism to order the data records using the particular reference value from the reference column 20 to get to the actual data record. When referring to sorted data records and the records being in successive order, this refers to both the data records themselves being sorted or accessing the data records through a sorted index as illustrated.

The sorted index 12 will contain a separate entry corresponding to each data record contained in the plurality of data records 10. After the sort, all data records having the same combination of index column values will be in successive order. When using an index, the sort key columns 18 become the index columns. The number of sort key columns 18 must be less than or equal to the number of field columns 16. Each sort key is chosen from among the fields of the data records and may be ordered in an arbitrary fashion. For example, sort key 1 may correspond to field 7, sort key 2 may correspond to field 3, and so forth.

When sorted in the index, multiple entries often exist having the same combination of sort key values and the only difference is the reference value to the actual data record. As mentioned previously, a major advantage of using a sorted index 12 is that other indices may be created using different fields or a different order of fields as the sort keys.

The header table 14 is usually much smaller in size than the sorted index 12 or the plurality of data records 10 in terms of the number of entries. Header table 14 forms a skeletal structure of the sorted data records that can be more quickly traversed than the sorted data records themselves since data records are only accessed when necessary, thereby allowing an efficiency for creating and displaying a categorization table. The number of rows in this exemplary embodiment will equal the number of headings in a fully expanded categorization table.

The header table 14 has a plurality of category columns 22. The number of category columns 22 will be less than or equal to the number of sort key columns 18. Furthermore, the category columns 22 correspond linearly with sort key columns 18 such that category 1 corresponds to sort key 1, category 2 corresponds to sort key 2, and so forth.

The count column 24 will contain values that correspond to the number of sorted data records having the unique combination of category column 22 values. In this manner, size compression is achieved without sacrificing the ability to reach each individual data record during traversal of header table 14 by using the unique combination of category column values 22.

Header rows are used to determine the headings (or headers) of the categorization table, and to display portions of the actual data records under the appropriate headings in the categorization table and to display portions of the actual data records under the appropriate headings. The count value in the count column 24 for the header rows indicates the number of data records having the unique combination of category column values, if any, that apply to the header corresponding to that unique combination of values. Because the data records are in successive order, they may be successively accessed once the initial data record is located by using the unique combinations of values to quickly find the corresponding initial row in the index or data records themselves. The count value will determine how many successive data records to access.

Figure 2A:
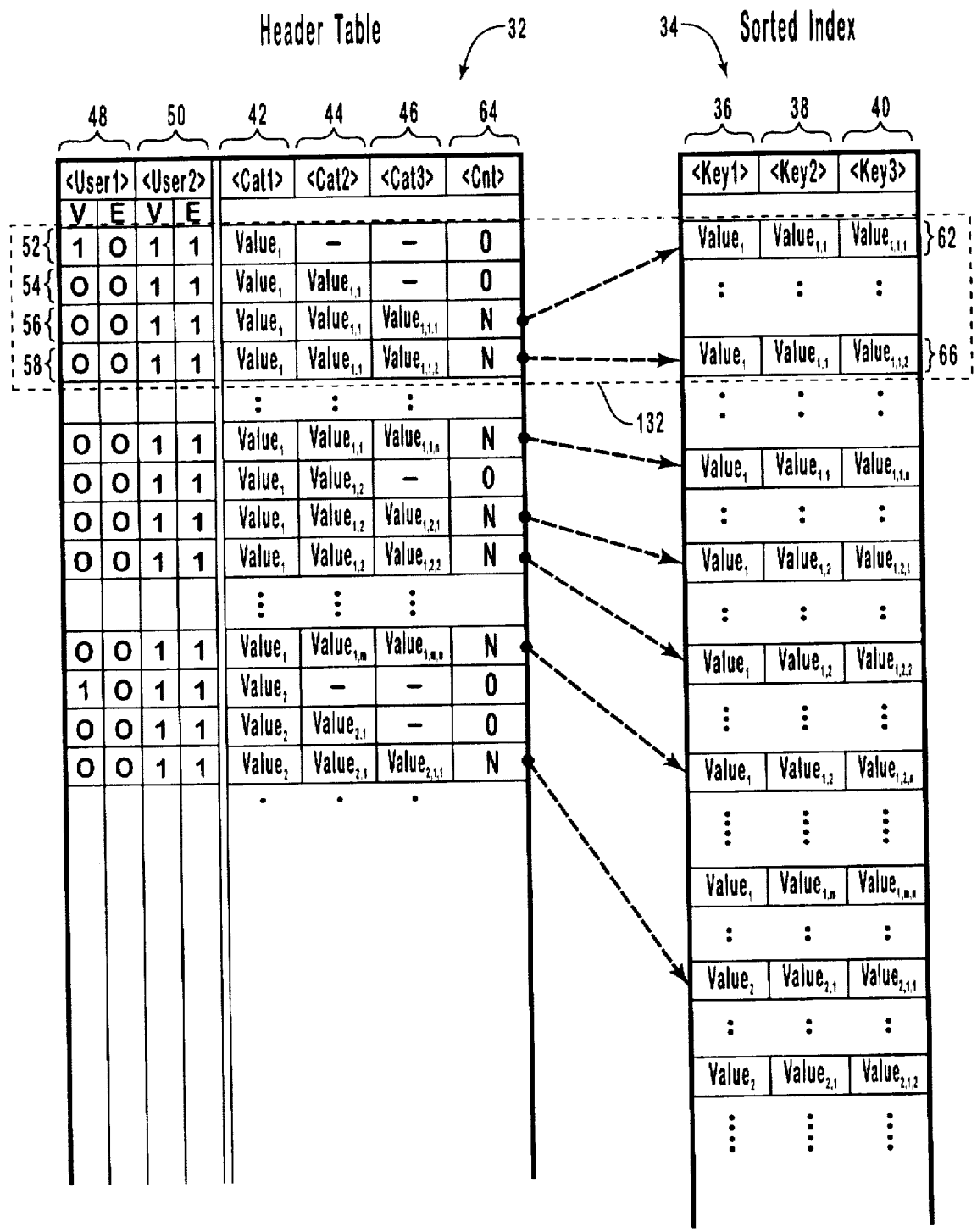
FIGS. 2A and 2B are a detailed drawing of a header table depicting the various values and organization within the table and how the header table is used to access data records through a sorted index.
Figure 2B:
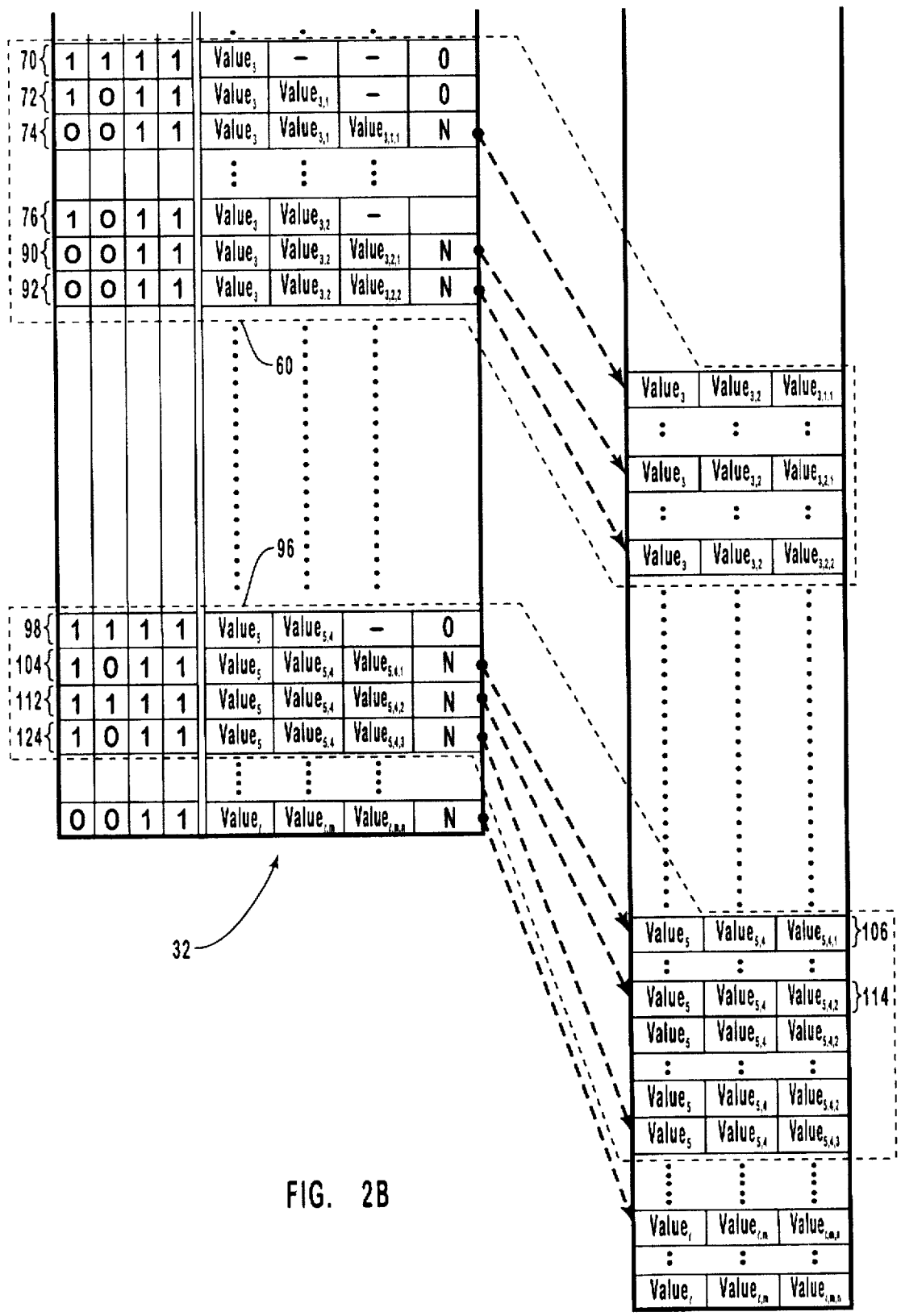

Referring now to FIGS. 2A and 2B, a more detailed illustration of a header table and how it correlates to a sorted index is shown. Header table 32 is used to access sorted index 34 which in turn references the actual data records. Alternatively, header table 32 could be used to access the sorted data records directly. The rows of sorted index 34 are comprised of three sort key values that have been sorted starting with sort key 1, then sorted again by sort key 2, and finally sorted by sort key 3.

The values contained in a given row have subscripts that indicate their position within the sort. For example, values in a sorted index row for sort key 1 are listed from subscript 1 through l where like subscript values indicate like actual values.

For the values in a sorted index row for sort key 2, there are two subscripts separated by a comma. The first subscript will be the same as the corresponding subscript for the value associated with sort key 1, and the second subscript will indicate the actual value of sort key 2 that corresponds with sort key 1. In this manner, the second subscript will be designated for sort key 2 ranging from 1 to m for each associated subscript in sort key 1.

The values for sort key 3 follow the same pattern using three subscripts. The first two subscripts indicate the associated values in sort key 1 and sort key 2, respectively, while the third subscript ranges from 1 to n for each value associated subscripts sort key 1 and sort key 2.

The category columns of header table 32 follow the same notational pattern and the combination of values in a row will correspond to a like combination of values in the sorted index 34. A value with the same subscripts will be the same whether in header table 32 or in sorted index 34.

The header table 32 also has user 1 view attribute column 48 and user 2 view attribute column 50. These columns retain a particular user's view and are used to allow independent control and creation of categorization tables by different users. This is particularly true in a distributed environment where the data records and header tables are located on a central server with various clients accessing the data through the categorization table. Each user view attribute column 48 and 50 has subcolumns V to indicate whether that particular row is visualized, meaning that it is part of the user selected view into the categorization table, and subcolumn E to indicate whether that particular row is expanded, meaning that there are other subheadings or data records to be listed. Throughout this example, a "1" indicates that a particular row is visualized or expanded while a "0" indicates that a particular row is not visualized or the categorization header is collapsed rather than expanded. While FIGS. 2A and 2B only illustrate two user view columns, it will be appreciated that additional columns may be added to header table 32 to define any number of user views.

The header table 32 is composed of two variations of header table rows. The first indicates headings and subheadings in the visually displayed categorization table with no associated data. These header rows are indicated by a count value of zero. For example, row 52 is a representation of a category level 1 (the "highest" or "shallowest" category level) of a categorization table. Note that the level is indicated by the null values in the category level 2 column 44 and the category level 3 column 46. Header row 54 is a category level 2 subheading which again is indicated by the null value in the category level 3 column 46. Header rows that do not have data associated with the row are used to create structure in the categorization table and will have only subheadings listed below them. Further, the null values within the unique combination of category column values is used to help determine indentation.

The other variation indicates data records are associated with the heading by having a non-zero count value. For example, header row 56 is used to look up or access the sorted index row 62 which is the first sorted index row corresponding to the unique combination of header table category column values indicated by header table row 56. The value "N" in the count column 64 on header table row 56 will indicate the number of data records that correspond to the unique combination of category column values indicated by header row 56. Since the data records as represented in the sorted index 34 having the same combination of values will be organized in successive order beginning with sorted index row 62, a processor may simply retrieve the appropriate number of successive data records.

Figure 6:
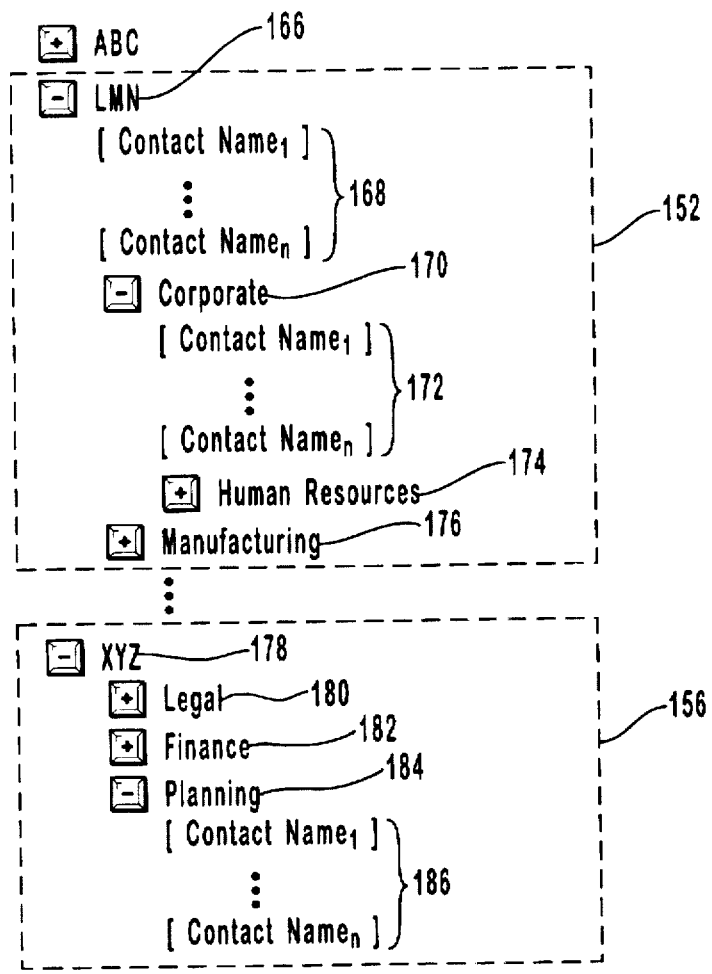
FIG. 6 is a detailed drawing of the categorization table created by traversal of the header table of FIG. 5 and corresponds to the user 1 view attribute column.
Figure 7A:
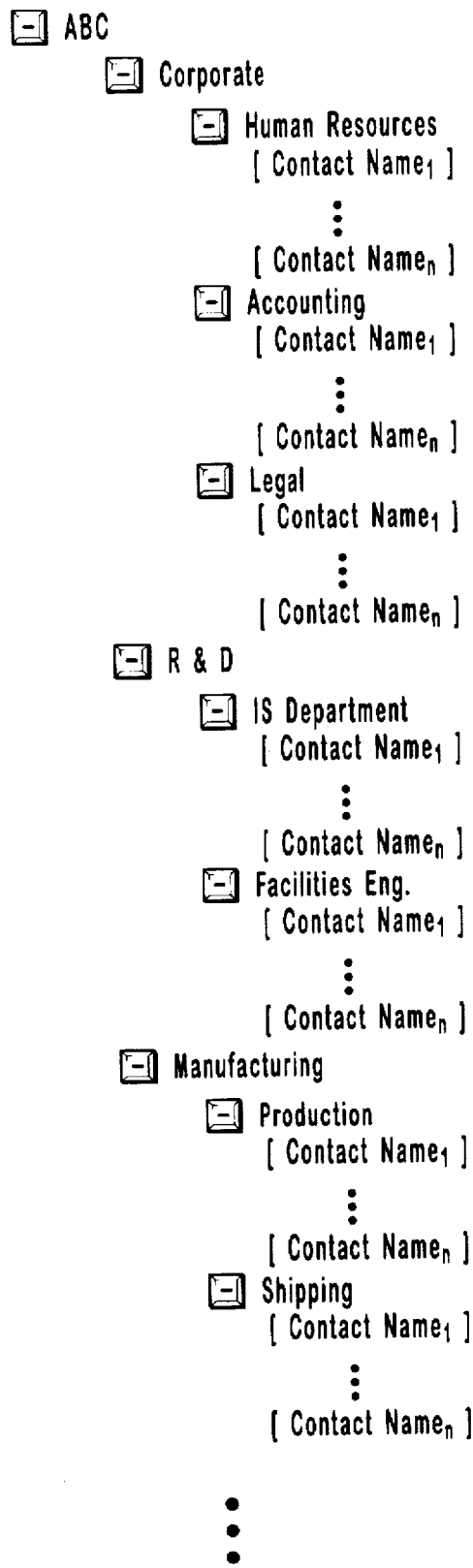
FIGS. 7A and 7B are detailed drawing of the categorization table created by traversal of the header table of FIG. 5 and corresponds to the user 2 view attribute column.
Figure 7B:
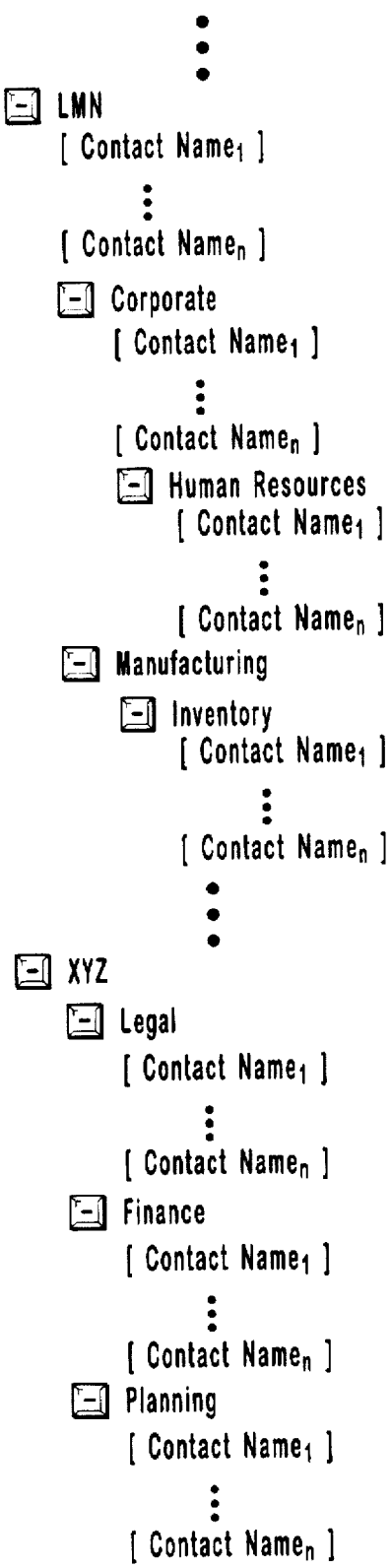

Header row 58 works in like manner and is used to access sorted index row 66. Again, the value "N" in count column 64 on header row 58 indicates the number of successive data records having the unique combination of category column values shown on header table row 58 beginning with sorted index row 66. For the particular header table shown in FIGS. 2A and 2B, only the "deepest" or "lowest" category levels have data records associated therewith. Another example as discussed in connection with the header table of FIG. 5 that produces the categorization tables shown in FIGS. 6 and 7A–7B shows data records shown associated with different levels so that an expanded categorization table row may have both data records and headers listed beneath it.

In this particular embodiment, the header table rows are ordered in the same order as the categorization table headings and subheadings they represent. In other words, a fully expanded categorization table would display information from each successive row of the header table. Those skilled in the art will note that other ordering arrangements are possible that may result in the same categorization table though header table traversal may be different due to the different ordering of the header table rows.

Figure 3:
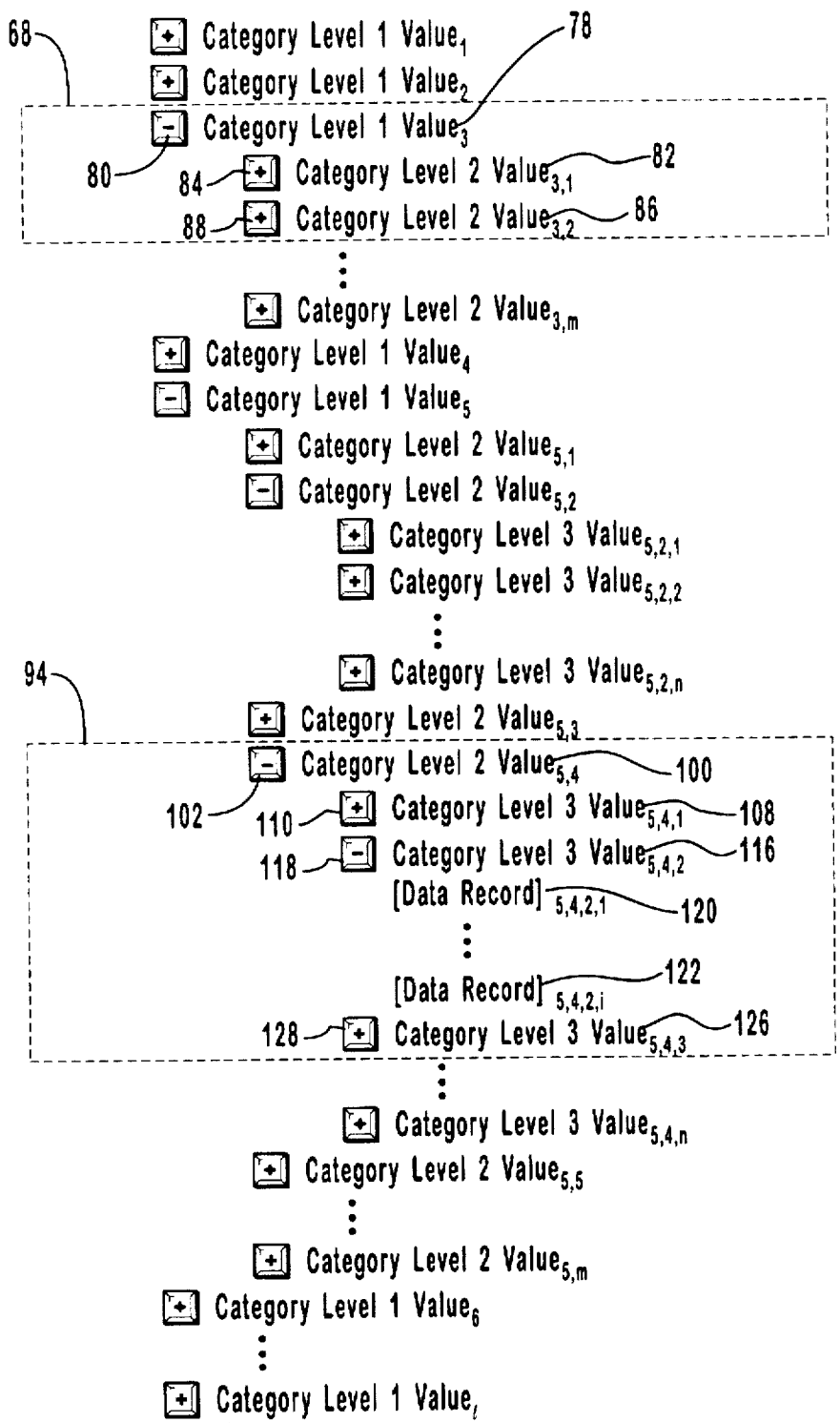
FIG. 3 is a detailed drawing of an actual categorization table created by traversal of the header table of FIGS. 2A and 2B and corresponds to the user 1 view attribute column.

FIG. 3 shows an example of a categorization table as it would be viewed in a form of display means, such as a computer monitor. Box 68 encompasses a portion of the categorization table that corresponds to that portion of header table 34 and sorted index 34 enclosed within box 60 in FIG. 2B. Furthermore, the categorization table illustrated in FIG. 3 corresponds to the user I view attributes column 48 of header table 32. An example of traversing the header table 32 in the area encompassed by box 60 to generate the portion of the categorization table of FIG. 3 encompassed by box 68 now follows.

A processor, typically a CPU in a client or server computer system, will process header row 70 as part of its traversal of the entire header table 32. Upon determining that the user 1 view attribute column 48 visibility attribute is set, the processor will display value$_3$ from the header row 70 as a category level 1 heading. Further, upon finding the expansion attribute also set, the expansion indicator 80 is set with a "–" to show that the category level 1 heading 78 is in the expanded condition and other subheadings will be listed.

Upon processing header table row 72, the visibility indication in the user 1 viewing attribute column 48 is set so that category level 2 heading 82, using value$_{3,1}$, from the table row, is output. Since there is no indication of expansion for header row 72, a "+" is placed in the expansion indicator 84 in order to signify to the user that more subheadings or data records are available and can be accessed by toggling expansion indicator 84 to expand the categories.

Upon processing header row 74, visibility is not set; therefore, the processor may continue on without further processing of header row 74. All of the header table rows between header row 74 and header row 76 will be quickly processed since the visibility will not be set for any of those rows. Upon reaching header row 76, with the visibility set, category level 2 heading 86 is created using value$_{3,2}$, from the header row 76. Again, the expansion column is not set for header row 76 and the expansion indicator 88 is filled with a "+" symbol to indicate a collapsed state. As processing continues onto header table rows 90 and 92, nothing will be output to the categorization table on FIG. 3 since visibility for each of those rows is set to "0".

Another example of header table traversal shows how actual data records are shown in the categorization table of FIG. 3. The area of the categorization table of FIG. 3 encompassed by box 94 corresponds to the traversal of the portion of the header table 32 contained within box 96 in FIG. 2B. The processor will begin processing header row 98 that is both expanded and visible. This corresponds to the category level 2 heading 100 with a "–" within expansion indicator 102. Header row 104 is also visible and the corresponding category level 3 heading 108 is displayed in the categorization table. The expansion indicator has a "+" showing that there are data records to be accessed when this is toggled. Though the header table row 104 can be used to quickly access sorted index row 106 to allow accessibility of the actual data records, the header row 104 is not expanded and the processor need not access those sorted index rows. This is contrasted with the processing of header table row 112 as follows.

When processing header row 112, not only is visibility set but expansion is also set. First, a category level 3 heading 116 is created, using value$_{5,4,2}$, from the header row 112, with the expansion indicator 118 having a "–" indicating the expanded state. Next, all data records having the unique combination of category column values shown in header table row 112 are accessed and displayed. The header row 112 is used to quickly look-up or access sorted index row 114 which is the first of a number of index rows having the same unique combination of header table category column values. The first indicated data record 120 is displayed and each successive data record is accessed until the last indicated data record 122 is displayed.

It may be noted that displaying the data record may occur in a variety of different ways. For example, a portion of the data record itself may be displayed. Alternatively, the title of the data record, or any other unique indication that would be helpful to the user of the categorization table may be displayed. Those skilled in the art will undoubtedly see many variations that may be utilized.

As processing continues onto header row 124, which is not expanded, a category level 3 heading 126 is created using value$_{5,4,3}$, from the data row and a "+" is placed in the expansion indicator 128 showing the category level 3 heading in the collapsed state. In this way, the portion of the categorization table encompassed in box 94 is created by traversal of the header table 32.

Figure 4:
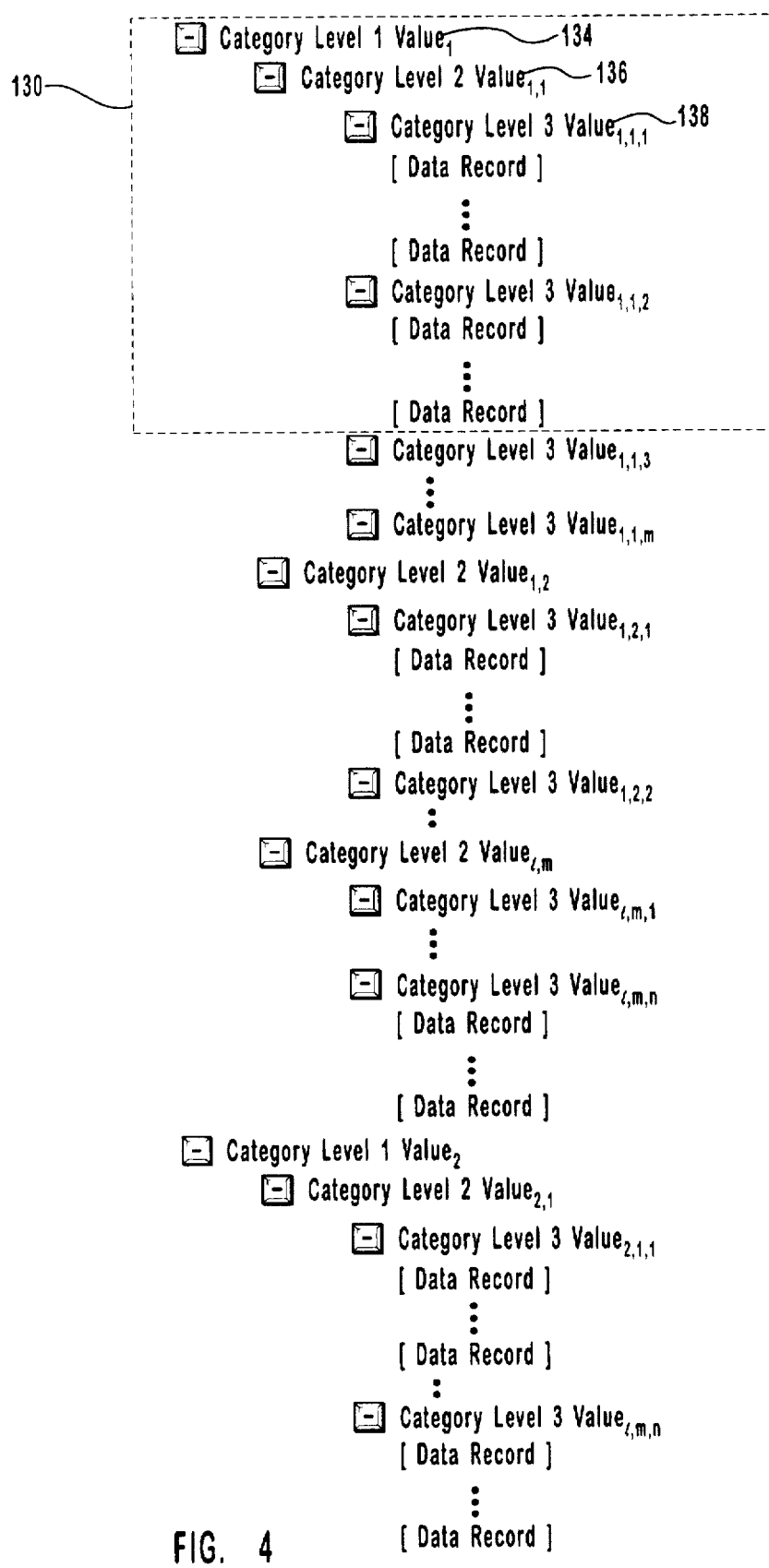
FIG. 4 is a detailed drawing of an actual categorization table created by traversal of the header table of FIGS. 2B and 2B and corresponds to the user 2 view attribute column.

FIG. 4 is a drawing showing a categorization table corresponding to the header table 32 that is fully and completely expanded. This corresponds to the view established by the user 2 view attribute column 50 of the header table 32 as found in FIGS. 2A and 2B. The portion of the categorization table of FIG. 4 encompassed by box 130 corresponds to traversal of the portion of the header table 32 encompassed by box 132.

Having a fully expanded categorization table as shown in FIG. 4 is the worst case scenario for traversing the header table 32 of FIGS. 2A and 2B in terms of processing steps should the entire categorization table be displayed. This can readily be seen by the values found in the user 2 viewer attribute column 50 that correspond to the fully expanded view into the data records. All of the visualization and expansion locations are set so that all the actual data records will need to be accessed. Category headings 134, 136, and 138 correspond respectively to header table rows 52, 54, and 56 and are traversed and processed in the manner described previously.

FIG. 5 is a detailed drawing showing a categorization table into a database of contact names. It is categorized by the company where the contact resides including further categories for the division of the company and the department within the division where the contact may be located.

From the header table shown in FIG. 5, the categorization table shown in FIG. 6 results using the user 1 view attributes column and the categorization table shown in FIGS. 7A and 7B (the fully expanded categorization table) corresponds to the user 2 view attribute column.

The header table of FIG. 5 particularly points out how a given heading level may have both contact names as well as other subheadings listed underneath it. This is shown by the header table rows enclosed by box 150 and the portion of the categorization table of FIG. 6 encompassed by box 152. Further, the header table at FIG. 5 illustrates a situation where there are null values in the table and one way of traversing the table to create the categorization table. Specifically, the Company XYZ whose entries are represented in the header table of FIG. 5 as encompassed by box 154, is a small company with no divisions. The corresponding portion of the categorization table of FIG. 6 is shown encompassed by box 156.

The header table row 158 of the header table of FIG. 5 is an entry for the LMN Company having data records (i.e., contact names) associated therewith. Realistically, these are contacts wherein neither the division nor the department are known for the contacts. When traversing the header table using the user 1 view attributes column, the expanded heading 166 (LMN Company) is created with a listing of the plurality of contact names 168. As the next header table row 160 is traversed, again using the user 1 view attributes column, the expanded heading 170 (Corporate Headquarters) with the corresponding plurality of contact names 172 listed there below is created. As header row 162 is traversed, the collapsed heading 174 (Human Resources Dept.) is placed at the same level as the plurality of contact names 172. Finally, header table row 164 is traversed to produce the collapsed heading 176 (Manufacturing Division) that lies at the same level as the plurality of contact names 168, the expanded heading 170 (Corporate Headquarters) and the collapsed heading 174 (Human Resources Dept.) all listed underneath the expanded heading 166 representing the LMN Company.

This illustrates how data records (e.g., contact names) and headings may lie at the same level. Specifically, plurality of contact names 165, heading 170 (Corporate Headquarters), and heading 176 (Manufacturing Division) at the same level underneath and plurality of contact names 172 and heading 174 (Human Resources Dept.) at the same level underneath the expanded heading 170 (Corporate Headquarters).

Those skilled in the art will note that variations exist as to the appearance and operation of a categorization table that may be facilitated by organization of the header table rows or by processing during traversal of the header table or both. The categorization table of FIG. 6, as well as those shown in FIGS. 3, 4, and 7, are given by way of example and not by limitation.

One possible variation that could be made to the categorization table as shown in FIG. 6 is the addition of an expandable "blank" heading above and in connection with the plurality of contact names 168. With such a "blank" heading in the collapsed state, the plurality of contact names 168 would not be visible while they would be listed beneath the "blank" heading in the expanded state.

The "blank" heading variation described above could be created during traversal of the heading table of FIG. 5 with extra processing or an additional header table row could be added to facilitate implementation. Naturally, those skilled in the art will fashion the present invention around such design parameters to achieve effective solutions according to a specific implementation.

To process the header table entries representing the contacts found within the XYZ Company as encompassed by box 154 in the header table of FIG. 5, an interesting anomaly is found in that there is a null value for the division category while there exists valid entries for the department as would be the case for a smaller company that is not broken into divisions.

One way to handle such an anomaly is to concatenate the actual categorization table to thereby skip the division level. Initially, header table row 188 is processed to create the heading 178 (XYZ Company) having no data records associated therewith thereby beginning the portion of the categorization table of FIG. 6 as encompassed by box 156 that corresponds to the entries of the header table of FIG. 5 encompassed by the box 154. Again, the processing of all header table rows to produce the categorization table of FIG. 6 requires using the user 1 viewing attributes column.

Next, the header table row 190 representing the legal department is processed to create the collapsed heading 180 (Legal Dept.) that is placed at the same level a division heading would be placed should there have been a valid division value. In like manner, header table row 192 is traversed to create the collapsed heading 182 (Finance Dept.). Finally, the header table row 194 is traversed to create the expanded heading 184 (Planning Dept.) having there below the plurality of contact names 186 that are accessed from the actual data records by using the unique combination of category column values to access the corresponding initial data record in the sequentially sorted data records to quickly access the data records corresponding to the plurality of contact names 186.

FIG. 7A and 7B represent the fully expanded categorization table corresponding to the header table of FIG. 5 when using the user 2 view attributes. The categorization table is created and processed as has been explained previously.

Because the size of the categorization table will vary depending on the view selected by a particular user, it is common that the final size of the categorization table is larger than the area of the display means allocated to display the categorization table. Often, a window is created that displays a portion of the categorization table and gives a fractional position indication as to which portion of the categorization table is being displayed in the window. Accurate representation of the fractional position is critical to allow the user to navigate through the categorization table to find the desired information.

The fractional position is often indicated by a solid scroll bar set within a scrolling column that runs along a side of the window wherein the categorization table is viewed. The size of the scrolling column is representative of the size of the categorization table view selected by the user (or it may be the total size of all the data records). The size of the scroll bar is representative of the amount of the categorization table displayed within the boundaries of the window. The positioning of the scroll bar within the scrolling column indicates the relative location within the table that the portion viewed is located.

Header table 32 (or the header table of FIG. 5) offers a convenient way of making fractional position calculations that are quick and accurate. By way of example and not by limitation, each header or data record shown in the categorization table can take one line of space in the display window capable of displaying so many lines of display. Some implementations may require headings that take more lines of space or data records that take more lines of space and the example shown herewith of fractional position calculation can be modified accordingly.

The header table indicates all of the visible elements that will correspond to the categorization table in the user view attribute column associated with the particular view and user. Therefore, the total number of lines representing the total size of the categorization table can be summed by adding one for each visible header row and the count value in each visible header row. The number of lines shown in a window wherein the categorization table is displayed can be readily calculated by the physical size of the window, font size of displayed lines, etc. By dividing the number of lines in the display window by the total number of lines of the categorization table a percentage size of the bar with respect to the column is readily calculated.

The positioning of the scroll bar within the scrolling column will be based as the beginning point in the categorization table where records are displayed in the display window. This beginning point will be used in conjunction with the total number of lines to get the appropriate location for placement of the bar within its column. In this manner, the fractional position information can be readily calculated without traversing the entire database of information.

It is important to note that more information may be included in the header table as is relevant to a given implementation. Those skilled in the art will see that information regarding the total number of items contained under a collapsed heading or subheading could be readily calculated. Likewise, some implementations may track the number of unread items amidst the data records. Again, those skilled in the art will note many variations on the common theme.

Those skilled in the art will see many variations in performance enhancements that will increase the efficiency of this invention and allow a categorization table with corresponding view information and fractional position information to be quickly accessible for dynamic interaction in real time. For example, the header table would automatically be updated for changes that occur in the data records such as insertions, deletions and modifications. Also, totals representing the total number of lines for a particular user view could be maintained and altered as the user changes the view thereby avoiding a complete traversal of the header table in order to update fractional position information. Additionally, beginning point markers indicating the location in the header table where the categorization table begins to be displayed within the display window along with the number of lines within the display window can be stored to allow processing of the header table only at the relevant portion for actual display.

In a distributed environment where the data records, sorted indices, and header tables are stored at a server while viewing is done by individual clients, it becomes advantageous to allow the user to have the user view attributes column stored at the client computer since there may be hundreds of different users. The server will only hold a fixed number of client view attribute columns at a time due to storage constraints.

A caching scheme is arranged whereby the most current users have their user view attribute columns actually stored in the header table according to a Least Recently Used (LRU) algorithm. When a user is bumped according to the LRU algorithm, the current state of the user viewing attributes column may be sent to the client computer for storage. When the user makes a relevant change, the client returns the user viewing attributes column to be inserted back into the header table wherein reconciliation will occur with any changes to the data records prior to making relevant display calculations and displaying the categorization table. Naturally, those skilled in the art will see a variety of different possibilities that could be used in a such a distributed environment and the foregoing is given by way of example and not by way of limitation.

The categorization table may be created by a computer program product directing and controlling a general purpose computer. The computer program product will consist of some medium such as magnetic disks or CD-Rom having computer readable program code means to configure the computer. The program code means will configure or cause the computer to make and traverse the header table in order to create and display the categorization table on an appropriate display means.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system comprising a CPU, an input/output means connected to the CPU, a storage system accessible to the CPU containing a collection of data records, and a display means, a method for creating and displaying a categorization table having N different levels of categories, the categorization table categorizing a quantity of data records sorted by at least N different data record fields, using values of each category level to form category headings, and listing information representing data records associated with the category level headings according to category value and hierarchy, the method comprising the steps of:

the CPU creating a header table in the storage system having N category columns and a count column, the header table comprising a plurality of header rows, each header row having i) a unique combination of category column values with each category column value corresponding to a data record field value, and ii) a count value indicating the number of data records identified by the unique combination of category column values; and the CPU traversing the header table to access the desired sorted data records and heading information in the desired order from the storage system and displaying the categorization table on the display means.

2. In a computer system comprising a CPU, an input/output means connected to the CPU, a storage system accessible to the CPU, and a display means, a method for creating and displaying a categorization table having N different levels of categories, the categorization table categorizing a quantity of data records sorted by at least N different data record fields, using values of each category level to form category headings, and listing information representing data records associated with the category level headings according to category value and hierarchy, the method comprising the steps of:

the CPU sorting and referencing a plurality of data records having data record fields located in the storage system by at least N different data record fields;

the CPU creating a header table in the storage system having N category columns and a count column, the creation of the header table comprising the step of creating a plurality of header rows, each header row having a unique combination of category column values with each category column value corresponding to a data record field value, the unique combination of category column values for representing header categories and providing an indexing structure, and a count value indicating the number of data records identified by the unique combination of category column values;

the CPU traversing the header table to determine the category levels, category heading values, category hierarchy, and data record information to be displayed; and the CPU displaying the categorization table on a display means.

3. A method for creating and displaying a categorization table as recited in claim 2 wherein sorting and referencing the data records comprises sorting the data records by at least N different data record fields to create a sorted index and the header rows are used to access the first data record indirectly through the sorted index.

4. A method for creating and displaying a categorization table as recited in claim 2 wherein the header rows are ordered in the same manner as the corresponding categorization table headings and data records.

5. A method for creating and displaying a categorization table as recited in claim 2 wherein the categorization table is displayed on a separate display means for each of many users and the header table further comprises user view columns to control the appearance of the categorization table on the individual user display means thereby allowing each user to have a unique and independent view of the categorization table.

6. A method for creating and displaying a categorization table as recited in claim 5 wherein each user view column contains indication for the visualization of a header row and for the expansion of a header row, the visualization and expansion indication used while traversing the header table and displaying the categorization table to determine the unique and independent user view.

7. A method for creating and displaying a categorization table as recited in claim 5 wherein each user view column contains indication for the visualization of a header row and for the expansion of a header row, the visualization and expansion indication used while traversing the header table and displaying the categorization table to determine the unique and independent user view, and further comprising calculating a fractional position shown on the display means based on the position within the individual view of the user.

8. A method for creating and displaying a categorization table as recited in claim 5 wherein the each user view column further comprises regarding data records not previously viewed by the user.

9. A method for creating and displaying a categorization table as recited in claim 2 further comprising calculating a fractional position shown on the display means based on the position within the total number of data records.

10. In a computer system comprising a CPU, an input/output means connected to the CPU, a storage system accessible to the CPU containing a collection of data records, and a display means, a method for creating and displaying a categorization table having N different levels of categories, the categorization table categorizing a quantity of data records sorted by at least N different data record fields, using values of each category level to form category headings, and listing information representing data records associated with the category level headings according to category value and hierarchy, the method comprising the steps of:

the CPU sorting and referencing a plurality of data records in the storage system, the data records having data record fields, by at least N different data record fields to create a sorted field index;

the CPU creating a header table having N category columns, a count column, and a plurality of user view columns to control the appearance of the categorization table, the creation of the header table comprising the step of creating a plurality of header rows, each header row having:

a unique combination of category column values with each category column value corresponding to a data record field value, the unique combination of category column values for representing header categories and providing an indexing structure, an indication of visualization and of expansion for each user view column, and a count value indicating the number of data records identified by the unique combination of category column values;

the CPU traversing the header table to determine the category levels, category heading values, category hierarchy, user view of the categorization table, and data record information to be displayed; and the CPU displaying the unique view of the categorization table on a separate display means according to each active user view column.

11. A computer program product for creating and displaying a categorization table having N different levels of categories, the categorization table categorizing a quantity of data records sorted by at least N different data record fields, using values of each category level to form category headings, and listing information representing data records associated with the category level headings according to category value and hierarchy, the computer program product comprising:

a computer usable medium having computer readable program code means embodied in said medium for creating and displaying a categorization table, said computer readable program code means comprising;

program code means for causing the computer to sort and reference a plurality of data records having data record fields located in the storage system by at least N different data record fields;

program code means for causing the computer to create a header table in the storage system having N category columns and a count column, the creation of the header table comprising the step of creating a plurality of header rows, each header row having a unique combination of category column values with each category column value corresponding to a data record field value, the unique combination of category column values for representing header categories and providing an indexing structure, and a count value indicating the number of data records identified by the unique combination of category column values;

program code means for causing the computer to traverse the header table to determine the category levels, category heading values, category hierarchy, and data record information to be displayed; and program code means for causing the computer to display the categorization table on a display means.

12. A computer program product for creating and displaying a categorization table as recited in claim 11 wherein sorting and referencing the data records comprises program code means for causing the computer to sort the data records by at least N different data record fields to create a sorted index and the header rows are used to access the first data record indirectly through the sorted index.

13. A computer program product for creating and displaying a categorization table as recited in claim 11 wherein the header rows created by the program code means are ordered in the same manner as the corresponding categorization table headings and data records.

14. A computer program product for creating and displaying a categorization table as recited in claim 11 wherein the displaying of the categorization table comprises program code means for causing the computer to display the categorization table on a separate display means viewed by each many users and the header table further comprises user view columns to control the appearance of the categorization table on the individual user display means thereby allowing each user to have a unique and independent view of the categorization table.

15. A computer program product for creating and displaying a categorization table as recited in claim 14 wherein each user view column created by the program code contains indication for the visualization of a header row and for the expansion of a header row, the visualization and expansion indication used while traversing the header table and displaying the categorization table to determine the unique and independent user view.

16. A computer program product for creating and displaying a categorization table as recited in claim 14 wherein each user view column created by the computer contains indication for the visualization of a header row and for the expansion of a header row, the visualization and expansion indication used while traversing the header table and displaying the categorization table to determine the unique and independent user view, and further comprising calculating a fractional position shown on the display means based on the position within the individual view of the user.

17. A computer program product for creating and displaying a categorization table as recited in claim 14 wherein the each user view column created by the computer further comprises information regarding data records not previously viewed by the user.

18. A computer program product for creating and displaying a categorization table as recited in claim 11 further comprising calculating a fractional position shown on the display means based on the position within the total number of data records.

19. A system for creating and displaying a categorization table having N different levels of categories, the categorization table categorizing a quantity of data records sorted by at least N different data record fields, using values of each category level to form category headings, and listing information representing data records associated with the category level headings according to category value and hierarchy, the system comprising:

a CPU;

storage means, electronically coupled and responsive to said CPU;

means, electronically coupled and responsive to said CPU, for sorting and referencing a plurality of data records having data record fields located in the storage means by at least N different data record fields;

means, electronically coupled and responsive to said CPU, for creating a header table in the storage means having N category columns and a count column, the creation of the header table comprising the step of creating a plurality of header rows, each header row having a unique combination of category column values with each category column value corresponding to a data record field value, the unique combination of category column values for representing header categories and providing an indexing structure, and a count value indicating the number of data records identified by the unique combination of category column values;

means, electronically coupled and responsive to said CPU, for traversing the header table to determine the category levels, category heading values, category hierarchy, and data record information to be displayed; and means, electronically coupled and responsive to said CPU, for displaying the categorization table on a display means.

20. A system for creating and displaying a categorization table as recited in claim 19 wherein sorting and referencing the data records comprises sorting the data records by at least N different data record fields to create a sorted index and the header rows are used to access the first data record indirectly through the sorted field index.

21. A system for creating and displaying a categorization table as recited in claim 19 wherein the means for creating the header rows also orders the header rows in the same manner as the corresponding categorization table headings and data records.

22. A system for creating and displaying a categorization table as recited in claim 19 wherein the categorization table is displayed on a separate display means for each of many users and the header table further comprises user view columns to control the appearance of the categorization table on the individual user display means thereby allowing each user to have a unique and independent view of the categorization table.

23. A system for creating and displaying a categorization table as recited in claim 22 wherein each user view column contains indication for the visualization of a header row and for the expansion of a header row, the visualization and expansion indication used while traversing the header table and displaying the categorization table to determine the unique and independent user view.

24. A system for creating and displaying a categorization table as recited in claim 22 wherein each user view column contains indication for the visualization of a header row and for the expansion of a header row, the visualization and expansion indication used while traversing the header table and displaying the categorization table to determine the unique and independent user view, and further comprising calculating a fractional position shown on the display means based on the position within the individual view of the user.

25. A system for creating and displaying a categorization table as recited in claim 22 wherein the each user view column further comprises information regarding data records not previously viewed by the user.

26. A system for creating and displaying a categorization table as recited in claim 19 further comprising calculating a fractional position shown on the display means based on the position within the total number of data records.

* * * * *

UNITED STATES PATENT AND TRADEMARK OFFICE
CERTIFICATE OF CORRECTION

PATENT NO. : 5,752,025
DATED : May 12, 1998
INVENTOR(S) : Shakib, et al.

It is certified that error appears in the above-indentified patent and that said Letters Patent is hereby corrected as shown below:

Figure 2B, insert a line labeled --34-- to indicate the "sorted index" (the right column).

Col. 5, line 14, before "detailed" delete the --a--

Col. 5, line 14, after "detailed" change "drawing" to --drawings--

Col. 5, line 23, after "FIGS." change "2B" to --2A--

Col. 5, line 32, after "detailed" change "drawing" to --drawings--

Col. 9, line 20, after "header table" change "34" to --32--

Col. 9, line 22, after "user" change "I" to --1--

Col. 11, line 35, after "contact names" change "165" to --168--

Col. 15, line 43, after "comprises" insert --information--

Signed and Sealed this

Sixteenth Day of November, 1999

Attest:

Q. TODD DICKINSON

*Attesting Officer*    *Acting Commissioner of Patents and Trademarks*